(12) United States Patent
Ali et al.

(10) Patent No.: US 7,568,124 B2
(45) Date of Patent: Jul. 28, 2009

(54) DRIVING DATA BACKUPS WITH DATA SOURCE TAGGING

(75) Inventors: Abid Ali, Hyderabad AP (IN);
Karandeep Singh Anand, Kirkland, WA (US); Vijay Sen, Bangalore (IN);
Robert M. Fries, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 11/465,932

(22) Filed: Aug. 21, 2006

(65) Prior Publication Data

US 2007/0283017 A1    Dec. 6, 2007

(51) Int. Cl.
*G06F 11/00* (2006.01)
(52) U.S. Cl. .................... 714/6; 711/162; 713/193; 705/57
(58) Field of Classification Search ................. None
See application file for complete search history.

(56) References Cited

U.S. PATENT DOCUMENTS

| 5,893,905 | A | 4/1999 | Main et al. |
|---|---|---|---|
| 6,763,389 | B2 | 7/2004 | Kryskow et al. |
| 6,842,783 | B1 | 1/2005 | Boivie et al. |
| 6,915,386 | B2 | 7/2005 | Doyle et al. |
| 7,080,260 | B2 * | 7/2006 | Johnson ............... 713/193 |
| 7,240,219 | B2 * | 7/2007 | Teicher et al. ........... 713/193 |
| 7,383,462 | B2 * | 6/2008 | Osaki et al. .............. 714/2 |
| 2002/0038366 | A1 | 3/2002 | Harasawa |
| 2003/0120771 | A1 | 6/2003 | Laye et al. |
| 2004/0229638 | A1 | 11/2004 | Zimba et al. |
| 2005/0005271 | A1 | 1/2005 | Clymer et al. |
| 2005/0010461 | A1 | 1/2005 | Manos |
| 2005/0076154 | A1 | 4/2005 | Chambliss et al. |
| 2008/0086609 | A1 * | 4/2008 | Lesser et al. ............. 711/162 |
| 2008/0226082 | A1 * | 9/2008 | Brunet et al. ............ 380/277 |

FOREIGN PATENT DOCUMENTS

EP    1 349 314 A1    10/2003

OTHER PUBLICATIONS

Microsoft Computer Dictionary, 4th Ed. 1999, Microsoft Press, pp. 489, 28.*
Article entitled "A Scalable Monitoring Approach for Service Level Argeements Validation," by Mun Choon Chan and Yow-Jian Lin; Bell Laboratories, Lucent Technologies [online] date unknown [retrieved on Aug. 18, 2006] Retrieved from the Internet: URL: http://ieeexplore.ieee.org/xpl/abs_free.jsp?arNumber=896290.

(Continued)

*Primary Examiner*—Christopher S McCarthy
(74) *Attorney, Agent, or Firm*—Workman Nydegger (57) ABSTRACT

Implementations of the present invention allow clients (e.g., end-users, administrators, etc.) to associate data with one or more protection intents at the data/data source level. A backup server can then associate the data with a specific protection mechanism regardless of where the data/data source(s) are located, or regardless of how other like-data are being backed up. The backup server can then backup data that are associated with similar protection intents in a similar manner based on client specifications. The backup server can also monitor the various protection intents and associations to ensure that the protection intents are being met. For example, if the backup server identifies that data are not being backed up in accordance with their associated protection intent, the backup server can send one or more communications indicating the same, such that the protection mechanisms can be adjusted appropriately.

26 Claims, 4 Drawing Sheets

OTHER PUBLICATIONS

Article entitled "A Data Mart Approach for Monitoring Web Services Usage and Evaluating Quality of Services," by Sergio Manuel Serra da Cruz, Linair Maria Campos, Maria Luiza Machado Campos and Paulo F. Pires; Universidade Federal do Rio de Janeiro [online] date unknown [retrieved on Aug. 18, 2006] Retrieved from the Internet: URL: http://www.lbd.dcc.ufmg.br/sbbd2003/artigos/paper020.pdf.

* cited by examiner

DRIVING DATA BACKUPS WITH DATA SOURCE TAGGING

CROSS-REFERENCE TO RELATED APPLICATIONS

The present application claims the benefit of priority to Indian Patent Application Serial No. 1335/DEL/2006, filed in the Indian Patent Office on Jun. 2, 2006, and entitled "DRIVING DATA BACKUPS WITH DATA SOURCE TAGGING," the entire contents of which are incorporated herein by reference. The aforementioned Indian Patent filing was made pursuant to USPTO Foreign Filing License No. 536,416, granted on May 23, 2006.

BACKGROUND

1. Background and Relevant Art

As computerized systems have increased in popularity, so have the needs to store and backup electronic files and other communications created by the users and applications associated therewith. In general, computer systems and related devices create files for a variety of reasons, such as in the general case of creating a word processing document in a work setting, as well as creating a file used for more sophisticated database purposes. In addition, many of these documents can include valuable work product, or sensitive information that should be protected. One will appreciate, therefore, that there are a variety of reasons why an organization will want to backup electronic files on a regular basis, and thereby create a reliable restoration of an originally created file when needed.

One of the challenges facing organizations implementing one or more backup solutions is that data created and accessed within an organization can vary greatly (e.g., from simple word processing to database or system data). The various types of data may also be associated with varying levels of importance, which can in turn be associated with different backup protection needs. For example, some types of system data, which may not change frequently, may only need to be backed up every couple of days. By contrast, other types of sensitive mail or database data may change much more frequently, and thus may need to be backed up every few minutes. In addition, the needs to backup data with a particular frequency may often need to be balanced against system resource availability.

Complicating these issues is the notion that an organization might also implement different file systems, and/or mail and database systems at one or more different production servers, which can even be commingled. For example, users within the organization might access word processing or spreadsheet documents at one or more production servers, but alternatively access mail or other database program data at one or more different production servers. In some cases, the same production server may even host different types of data that vary widely in terms of how the various data need to be backed up.

Unfortunately, backup schematics are generally applied on a per-production server, or potentially on a per-volume basis. For example, a backup administrator might designate one or more production servers (or production server volumes) for one backup schema, and then designate one or more different production servers (or volumes) for a different backup schema. In turn, production server administrators might then place data (and applications) on the production servers that have been associated with a particular backup schema of interest. As a result, if data are moved from one production server to another, the data are likely to be associated with a different backup schema. Such dissociation of data from a particular backup schema can result in a number of inefficiencies, particularly where data that do not need to be backed up frequently are placed on a production server volume that is scheduled for frequent backups. Similarly, there may be some danger that more sensitive data are not backed up as frequently as possible when moved to the wrong production server.

An organization may attempt to ameliorate such problems by changing protection intents for particular production servers when needed. For example, a production server administrator might send one or more instructions to a backup administrator to adjust the backup intent at a particular backup application. The backup application might then adjust its activities in accordance with the new production intent, and then change how it instructs backup activities at the given production server. Alternatively, the backup administrator may make such a determination about backup schemas at production servers based on any number of factors, and then adjust the corresponding backup application accordingly.

Unfortunately, it may be difficult even for production server administrators to monitor the specific backup needs of each individual application or corresponding data on a particular production server. This is likely also true for the backup administrator who may even be further removed from the production server data activities. As a result, even adjusting protection intents at an administrator level for certain production servers may be insufficient as a means of ensuring particular backup schemas are associated with particular data and data types. While data creators (e.g., application end-users) may have a better feel for how the data they create should be protected, there is generally no mechanism for the end-user to assign a protection intent to a particular file. Rather, the end-user may be relegated to simply placing the file on a particular production server that is associated with a particular backup scheme.

Accordingly, there are a number of difficulties in the infrastructure and methods used in conventional backup systems that can be addressed.

BRIEF SUMMARY

Implementations of the present invention provide systems, methods, and computer program products configured to address data protection intents at relatively high levels of granularity, such as at the application or file level. In one implementation, for example, an end-user can associate data (and/or data sources) with one or more desired protection intents. A backup server can then identify the one or more protection intents for the data, and correlate the data with other data that have been associated with similar protection intents. As such, the backup server can ensure that protection intents are being met at the data level (and/or data creator level), regardless of where the data might reside at any given time. In at least one implementation, the backup server can also be configured to send an alert to any one or more of the end-user or an appropriate administrator if needed when protection intents are not being met.

For example, one example method from the perspective of a client (e.g., via a client computer system) of specifying one or more protection intents for data (and/or data sources) can involve opening a client interface. In addition, the method can involve identifying data/data sources at one or more production servers, where the data are identified as to be protected by one or more backup servers. The method can also involve selecting through the client interface one or more protection intents for the data to be protected. In general, the client can also define one or more properties for the selected one or more protection intents. Furthermore, the method from the client perspective can involve revealing the selected one or more protection intents to the one or more backup servers. As such, the client choices in protection intents can cause the one or more backup servers to retain data in a manner customized at the data level.

As such, an example method from the perspective of a backup server can involve identifying one or more protection intents that have been associated by a client with data to be protected. In addition, the method can involve identifying one or more properties associated with the identified one or more protection intents. The method from the backup server perspective can also involve identifying one or more production servers at which the data to be protected are stored. Furthermore, the method can involve organizing the data to be protected into one or more protection groups based on the associated one or more protection intents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to address data protection intents at relatively high levels of granularity, such as at the application or file level. In one implementation, for example, an end-user can associate data (and/or data sources) with one or more desired protection intents. A backup server can then identify the one or more protection intents for the data, and correlate the data with other data that have been associated with similar protection intents. As such, the backup server can ensure that protection intents are being met at the data level (and/or data creator level), regardless of where the data might reside at any given time. In at least one implementation, the backup server can also be configured to send an alert to any one or more of the end-user or an appropriate administrator if needed when protection intents are not being met.

One will appreciate, therefore, that implementations of the present invention can include a number of resources configured to meet end-user backup needs. For example, an appropriate administrator (e.g., a backup or production server administrator) can provide an end-user with previously defined protection intents that are configured so that end users can easily "tag" (i.e., associate and define) how to protect their data at relatively granular levels. These resources can also be configured so that end users can easily track whether their data protection goals are being met, and thus automatically track and protect data essentially at the point of creation. As such, implementations of the present invention can allow an end user to essentially drive backup functionality on the data level, rather than rely on volume or system level configurations from a backup administrator.

To accomplish these and other features described more fully herein, implementations of the present invention can include one or more predefined roles. For example, implementations of the present invention can include a "backup administrator" role. In general, backup administrators can be permitted to manage any appropriate resources for meeting the data source owners' selected protection intents. For example, a backup administrator might determine on what storage volumes (e.g., 170, 175) data associated with certain protection schemes (or protection intents) are backed up.

By way of explanation, frequent reference is made herein to the terms "data" and "data sources." Generally, a data source will be understood to mean something that creates or writes data, such as an application program. By contrast, the term "data" will be understood more broadly to mean the information created/written by the application program, and, in some cases, an application program itself (which contains "data"). For most intents and purposes with respect to implementations of the present invention, therefore, the terms "data" and "data source" will be essentially interchangeable, since protection intents can be defined on both the data (e.g., file) and on the data source (e.g., application that creates the file) levels.

In any event, implementations of the present invention can also include use of a "policy maker" role, which allows an entity to define certain protection intents. A policy maker can include any human operators such as a production server administrator, backup server administrator, application administrators, and can even include inanimate operators that operate in accordance with prescribed policy settings. In general, policy makers will be understood as those entities allowed to define and/or generate the predefined protection intents (e.g., 123, 127, FIG. 1A). Thus, policy makers can also include any number of key personnel inside (and/or outside in some cases) an organization, including anyone from an ordinary end-user to "subject matter experts," as well as "industry experts." Generally, a subject matter expert is any one who has an understanding of areas such as regulatory needs (e.g., privacy issues in a health database), as well as knowledge of best practices in data protection in the industry. In some cases the subject matter experts may even create the particular protection intent by using/extending the protection intent(s) described herein. However (and by whomever) created, the policy maker(s) create predefined protection intents, which can then be accessed by a wide range of clients.

Figure 1A:
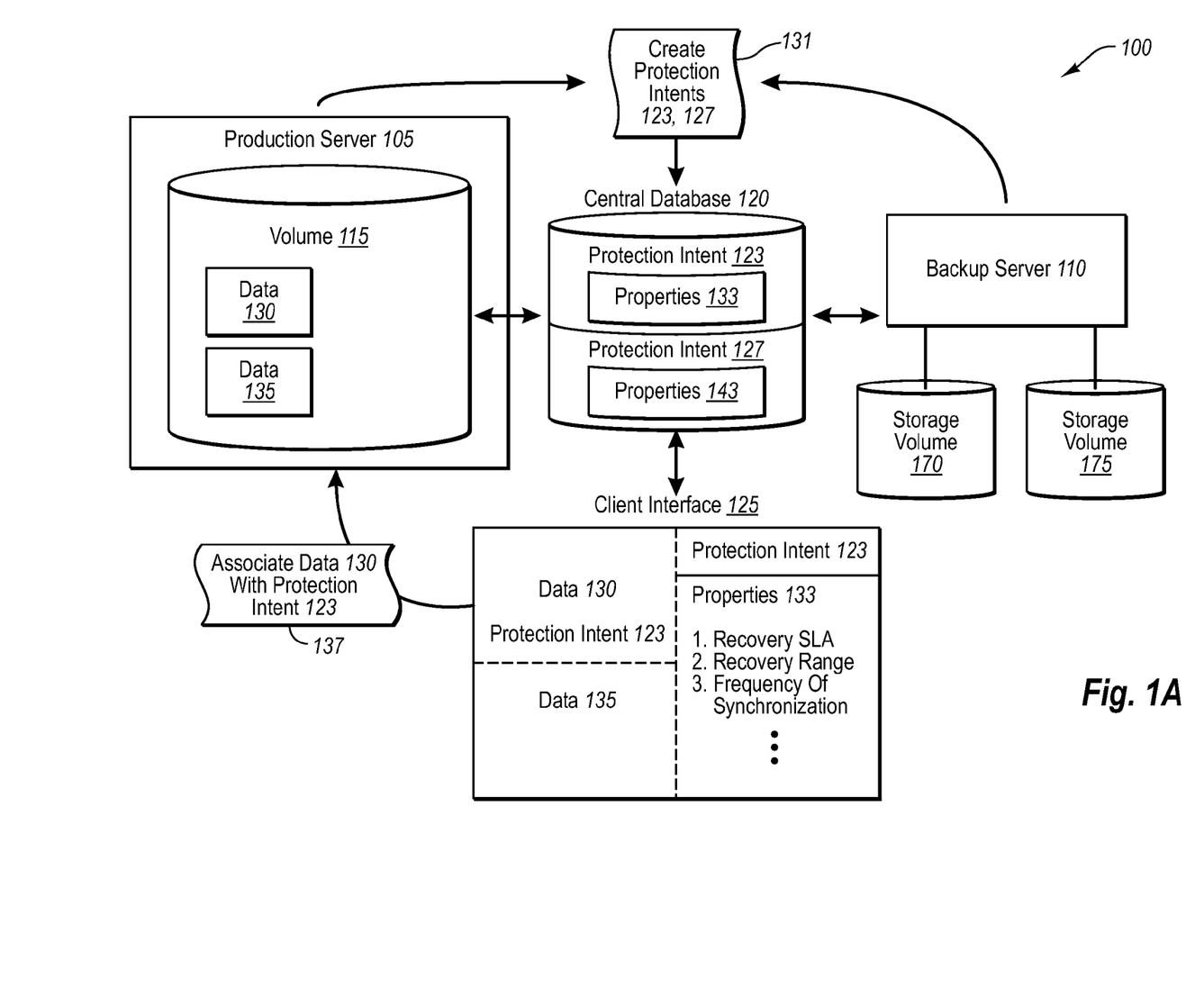
FIG. 1A illustrates a schematic overview in accordance with an implementation of the present invention in which a client associates one or more protection intents with one or more data sources.

As shown in FIG. 1A, for example, a policy maker (e.g., an administrator of production server 105 and/or of backup server 110, or another otherwise authorized entity) can define protection intents 123, 127. This can be done, for example, by identifying one or more system policies (e.g., 100 generally, 105, or 110), or resource capabilities for a particular system, and then sending one or more corresponding instructions 131 to create the protection intents. For example, FIG. 1A shows that an administrator of production server 105 (e.g., a mail, file, or database server) might send instructions 131. Instructions 131 in this case might be based on certain default property settings (e.g., 133, 143) for production server 105 resources. Similarly, FIG. 1A also shows that an administrator of backup server 110 may also send instructions 131. Instructions created by a backup server administrator might alternative have certain property settings (e.g., 133, 143) tailored for an organizational network generally, or even just for particular resources at backup server 110.

These protection intents can then be made accessible to one or more clients, such as a data source owner, end-user, policy maker, administrator, or the like. For example, FIG. 1A shows that backup system 100 includes a central database 120 in which are stored, for example, protection intents 123 and 127. In one implementation of the present invention with respect to the MICROSOFT operating environment, for example, central database 120 is an "Active Directory." In one implementation, central database 120 further comprises a directory of entity (users, machines, etc.) objects that can be associated with various groups, categories, roles, and permissions, and further associated with protection intents, protection groups, and so forth. Each object can also be associated with a particular protection intent, such that, for example, each bit of data created per a particular user object is associated with a particular protection intent.

One will appreciate, however, that use of a central directory/database, much less use of one specific to any particular operating environment, is not necessarily required. All that is typically needed is that the protection intents be accessible (e.g., "revealed") to an entity (e.g., a user, a policy maker, administrator, production server 105) that would select the protection intent, and an entity (e.g., backup server 110) that would implement the protection intent. For example, in one implementation, backup server 110 may simply be configured to scan data (e.g., file contents, file metadata entered by a user) and/or data sources to identify protection intents (or to assign protection intents based on what is discovered) in a specific production server volume. In some cases, this discovery could be done in addition to or even in lieu of just identifying selected data intents through a central database/directory. Accordingly, reference herein to a central database, as well as to any particular operating environment components, is exemplary only.

In any event, implementations of the present invention can further include a "data/data source owner" role, such as an end user, or another entity tasked with managing applications or data generally. Generally, the data/data source owner can be granted the privilege of selecting from the set of protection intents provided by policy makers when tagging their data. As shown in FIG. 1A, for example, a client (e.g., a data/data source owner) might access a client interface (e.g., 125) tool, such as a user interface tool or a command line interface tool. The client interface tool can, in turn, be configured to allow the client to associate one or more protection intents (e.g., 123) with data (e.g., 130) created through a particular data source. Of course, the client interface tool can also be used to change previously assigned protection intents, assign which protection intent(s) should override other protection intent(s) in certain situations, remove protection intent(s) altogether, and the like.

The data/data source owner may also be able to select one or more notification and alerting mechanisms configured to cause a backup server (e.g., 110) to send electronic messages when assigned protection intents are not being met. In addition, a data/data source owner may even be able to clad some data objects with certain customized protection guarantees that can override the protection intents of their data sources. One will appreciate, of course, that an administrator might nevertheless prohibit the customized selections of a particular data/data source owner from being available to other data/data source owners. In any case, these exemplary roles and components can be carried over through a number of different changes to roles and intents, and thus help optimize backup resources in backup system 100.

In any event, FIG. 1A illustrates an overview schematic diagram in which a client (i.e., a data/data source owner, a policy maker, and/or an administrator) selects one or more protection intents for a particular data/data source. As previously mentioned, there are a number of contexts in which this situation might occur. For example, an end-user may have created a word processing or spreadsheet document (i.e., "data") and desires to set a protection intent. Alternatively, an application administrator may be installing a particular program (i.e., "data source") on a server volume (e.g., 115), and is presented with one or more interfaces or menu items for specifying protection intents for all or some of the data created thereby. At some point, the client thus accesses a client interface (e.g., 125), which provides the various selections options, whether for a single bit of data, or for multiple bits of data, or even differentially for several data sets.

That is, the client might want to configure all documents created by a particular program to be backed up a certain way, or may desire to protect a certain file, or even a file type a particular way. As will be understood more fully herein, the client might also want to associate data with certain protection intents based on what users are creating the data, and/or where the users are creating the data. For example, certain users in some locations, certain users working in specific organization areas, or certain users with specific levels of document access may need to have different levels of backup protection. The client may thus want to not only specify how certain files or file types are backed up, but also how these files might be backed up given who created the file in the first place.

In particular, the client may want to designate that all data residing on computers in the finance organizational unit should have protection intent "X," or that all spreadsheet data residing on a particular computer at location "F" should have protection intent "Y." Similarly, the client may want to designate that all data residing on computers in organizational units associated with property "critical" should have protection intent "Z." In addition, the client (or protection intent maker) may want to designate that all data created by or through a particular user object in central database 120 have protection intent "A," or that all data modified by this or another particular user object in central database 120 be associated with protection intent "B." Thus, by simple association of protection intents to such concepts, for example, as "locations," "types," "authors," and "editors" using the central database 120, document properties, file extensions, and file contents, the client can select and/or produce the desired protection policy.

To create such differential backups, therefore, the client can select at least one protection intent and corresponding properties for one bit of data (or data source, user object, etc.), and select another protection intent for another bit of data (or data source, user object, etc.) The client can also define one or more properties within the particular protection intent. Example 1 (below), therefore, illustrates one protection intent (e.g., 123, 127) that has one or more definable properties (e.g., 133, 143).

protection intent. The remaining property fields in this protection intent can thus be selected by a particular client (e.g., a data/data source owner, or a policy maker, etc.) when associating the protection intent with certain data.

For example, comparing Example 1 (above) with FIG. 1A, client interface 125 can present the client with additional choices (i.e., "properties") for any one or more additional properties for a selected protection intent. Such additional choices/properties can include such considerations as whether to backup on tape or other media (e.g., any magnetic or optical media), how long to storage backup updates (e.g., shadow copies), how long to retain backups, when and/or how frequently to create backups, etc. The client interface 125 can further present options to select whether to compress or encrypt data, one or more encryption or compression schemes if relevant, as well as a time to archive a particular backup to an archive media (e.g., migrate from disk backup to tape).

The client interface 125 can also present one or more options to register for alerts regarding success or failure of a selected protection intent associated with certain data/data sources. In at least one implementation, for example, the client could select an alert for when the data loss tolerance

EXAMPLE 1

| Parameters | Specified by Policy makers or data source owners | Specified by backup administrators (operational information) |
|---|---|---|
| Recovery SLA for high speed recovery specify DISK for long term retention specify TAPE (or other media) for disaster recovery specify DISK (offsite DPM mode) or TAPE | YES | NO |
| Recovery range How long to store shadow copies on disk How long to retain data on tape | YES | NO |
| Frequency of synchronization (when and how frequently to synchronize) | YES | NO |
| Time of shadow copy (when to create the snapshot i.e. backup on disk) | YES | NO |
| Which Storage Node to use (As part of DPM enterprise edition will use additional stateless servers to provide a scalable solution) | NO | Optional (specified when PS-admin is particular about location. Otherwise the location may be chosen by backup-admin to suit the recovery intent, etc.) |
| Which library to use (e.g., if using tape backup) | NO | YES |
| Which disks to use (and quantity of disk) | NO | YES |
| Which media to use (and quantity of tape) | NO | YES |
| Throttling (e.g., % of network bandwidth) | YES | Yes (if the owner of the network requests the backup admin to avoid loading the network) |
| Encryption | YES | NO |
| Compression | YES | NO |
| Time of archive | Yes (In case of disk to tape backups) | Yes (in case of disk to disk to tape backup, the backup admin might decide to stagger backup jobs to optimally use the library) |

As shown, a backup administrator may create a protection intent with certain preset properties, such as which particular tape libraries or disks to use when backing up certain production servers, various throttling data (i.e., network bandwidth usage), time to archive or the like. For example, a backup administrator may determine these properties in a particular protection intent, and then instruct (e.g., 131) creation of this associated with a specifically selected protection intent is not being met, or to send an alert when the recovery range is not being honored, and so forth. In such cases, client interface 125 can further provide one or more options for the client to insert additional field data, such as one or more email addresses (or other contact information) for these alerts. The alert registration details and email addresses can then be sent and/or stored along with the selection of the protection intent(s) and corresponding properties.

Upon making these various selections, the client (e.g., via client interface 125) can then send one or more instructions to an appropriate location, where they can be revealed to any backup services. In at least one implementation, for example, the client (e.g., via client interface 125) sends instructions 137 to production server 105, which includes instructions to associate data 130 with protection intent 127. Of course, instructions 137 can also include the selections for corresponding selected properties for the protection intent. In any event, the client could also send instructions 137 directly to central database 120, or even to backup server 110, if appropriate.

In general, the selected associations can be sent and/or stored in the corresponding data store in a variety of ways, such as in string form within an Extensible Markup Language ("XML") file. Alternatively, these selected associations can be sent and/or stored as a flat file in the same folder as the data/data source. In at least one implementation, a backup agent (e.g., 150, FIG. 1B) may identify the associated protection intent(s) when performing a periodic scan of the relevant production server volume (e.g., 115). In another implementation, however, a backup administrator may be alerted to the newly made protection intent associations as soon as the associations are sent to a particular directory/database (e.g., 120). For example, the database (e.g., 120) and backup server (e.g., 110) may communicate this information to each other via any appropriate push or pull communication mechanisms.

Figure 1B:
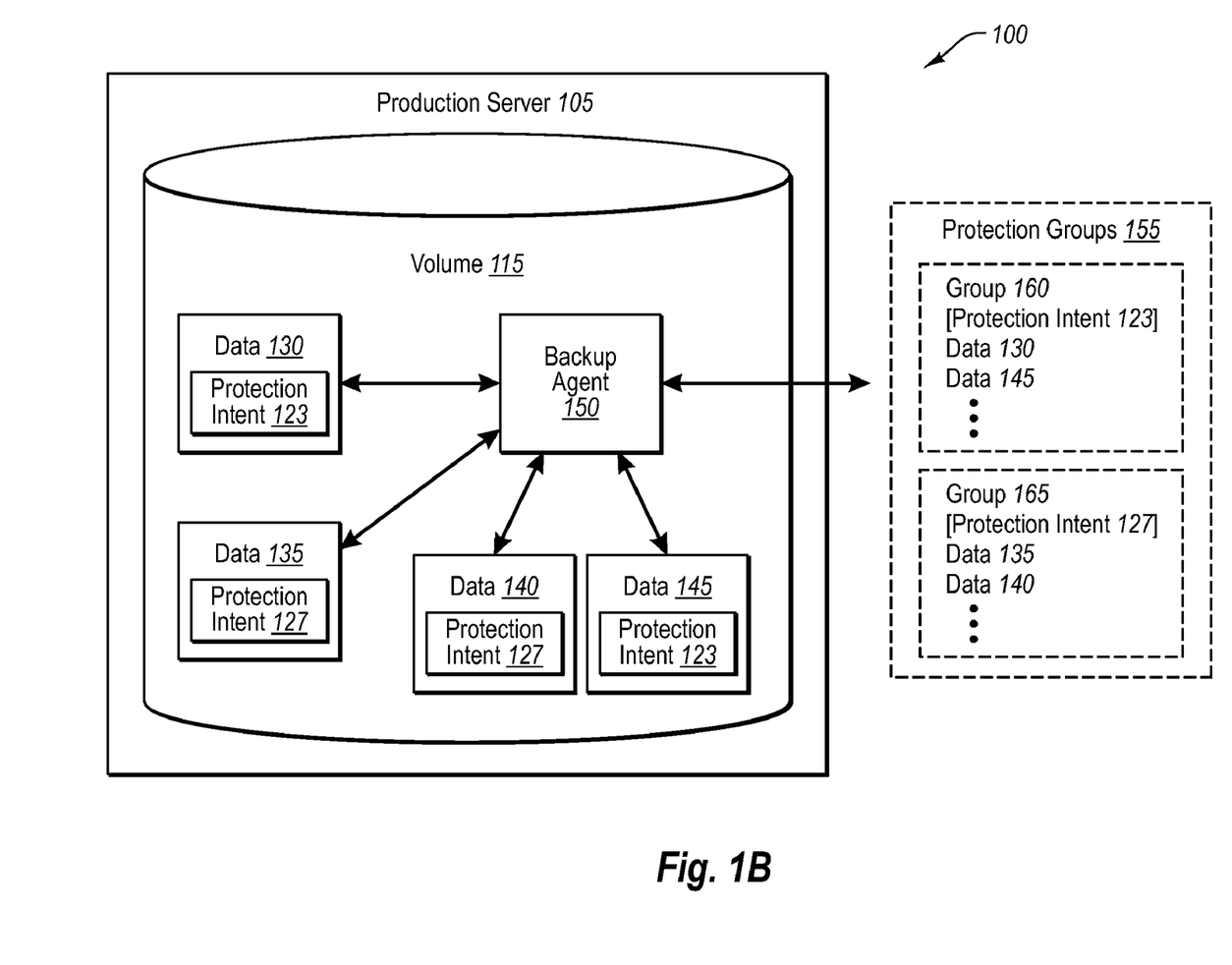
FIG. 1B illustrates a schematic overview in accordance with an implementation of the present invention in which differentially tagged data sources are organized into one or more protection groups based on associated one or more protection intents.

As shown in FIG. 1B, for example, backup agent 150 identifies that data 130 and 145 are associated with protection intent 123, while data 135 and 140 are associated with protection intent 127. FIG. 1B also shows that backup agent 150 further identifies that data 130 and 145 (as well as data 135 and 140) are associated with a particular protection intent (i.e., 123). Despite being associated with the same protection intent, one will appreciate that both data 130 and 145 (as well as data 135 and 140) could be further associated with different properties (e.g., 133). For example, data 130 may be associated with certain properties that indicate that all backups are to go directly to tape, while data 145 may be associated with certain properties that indicate that all backups are to go to a disk, and then to tape after a certain number of days. One will appreciate, therefore, that the generic associations described in the Figures and text herein are for purposes of convenience in illustration.

Accordingly, the backup administrator (e.g., via backup agent 150) can further use each of these protection intent associations (and any further correlations with protection intent properties) to associate the data/data sources in appropriate protection groups (e.g., 155). Generally, protection groups will be stored in central database/directory 120, though this is not necessarily required in all cases. For example, protection groups 155 could be stored on any backup server in an organization, and routinely synchronized with other protection group lists at any other backup servers.

In any event, and in one implementation, the backup administrator first identifies (e.g., via automatic means) whether the identified protection intent selections have been used earlier for other data/data sources. By contrast, the backup administrator may not be able to identify an appropriate preexisting protection group, or may choose for other reasons not to use an existing protected group. As such, the backup administrator can also create one or more protection groups in accordance with a particular protection intent and corresponding one or more properties, such as the properties indicated in Example 1 as "Specified by Backup Administrator."

By whatever means the protection groups are created, the backup administrator (e.g., via backup server 110 and/or backup agent 150) can ultimately segregate each of the data/protection intent associations into one or more protection groups that are best fitted thereto. For example, FIG. 1B shows that data 130 and 145 have the same protection intent, and are thus are associated in protection group 160. Similarly, FIG. 1B shows that, for similar reasons, data 135 and 140 are associated in protection group 165. Of course, one will appreciate that a protection group need not necessarily include only data/data sources from the same production server (e.g., 105). In particular, a protection group could include a wide range of data/data sources from a wide range of different production servers under the control of backup server 110.

If the backup administrator properties of the protection intent for a particular group have not already been set, the backup administrator could further specify at this point. For example, the backup administrator could select for each protection group (e.g., 160, 165) the storage node to use (e.g., an intermediate storage server positioned between a production server and backup server, which may be s "stateless" system), the library to use, the disk(s) to use, or the media to use. Of course, what the backup administrator further defines (or does not define), can vary widely. For example, a policy maker may have modified one of the protection intents to not include a selection of a particular storage node, or may have gained ownership of a particular storage node (not shown). In such a case, therefore, the backup administrator may not need to specify at which storage node backups for the associated data will be sent.

In any event, once the protection groups have been set for the identified data, backup server 110 and backup agent 150 can coordinate backup activities. (In some cases, backup server 110 may still need to push out a backup agent to the production server). Of course, a backup administrator (or policy maker) can also change protection intents seamless simply by changing aspects of group associations for protection groups 155. In particular, the backup administrator can change how specific files are backed up by adding or removing user objects and/or user group objects to/from a specific protection group in central database/directory 120.

For example, data 130 could be created entirely by one particular user (or a group of users in a user group) who originally specified that data 130 be protected by protection intent 123. At a later point, the user (or user group) may have moved into a different product group in the organization, at which point it may be more important to backup all of the user's (or user group's) data using protection intent 127. Rather than change each of the protection intents for all data and files for data 130, the backup administrator could simply move or otherwise add an object for the user (or object(s) for the user group) into protection group 165, which is associated with protection intent 127. As such, any of data 130 created by or associated therewith can automatically be backed up in accordance with protection intent 127.

Figure 1C:
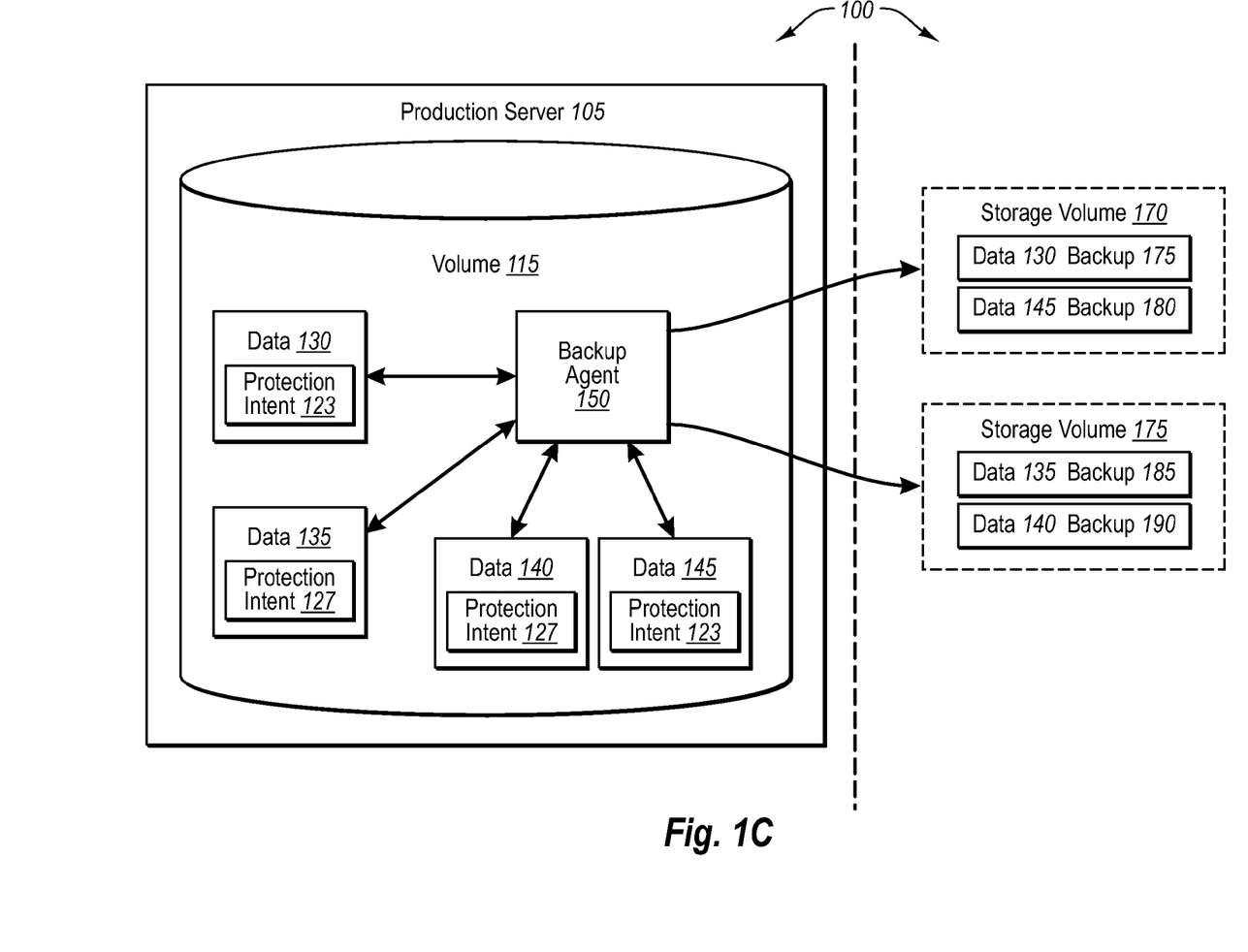
FIG. 1C illustrates a schematic overview in accordance with an implementation of the present invention in which data are backed up according to their respective protection intent and/or protection group associations.

As shown in FIG. 1C, for example, backup agent 150 can initiate and send backups 175 and 180 corresponding to data 130 and 145 to storage volume 170, in accordance with the defined protection intents for group 160. Furthermore, backup agent 150 can separately (or at the same time) initiate and send backups 185 and 190 corresponding to data 135 and 145 to storage volume 175 in accordance with the defined protection intents for group 165.

One will appreciate, therefore, that, in at least one implementation, data associated with a particular protection intent (e.g., 123) can be backed up to one storage volume (e.g., 170) that is different from another storage volume (e.g., 175)

where data are backed up according to a different protection intent (e.g., 127). This, however, is only one example of how the backup system 100 can be setup. For example, data of different protection intents can be backed up to the same storage volume of the same one or more storage entities, can be backed up to different storage volumes of the same storage entity, can be backed up to separate storage entities entirely, or can be backed up in part on the production server, and in part on another storage entity. The various storage volumes/servers, in turn, can be designated for certain replication frequencies, times of replication, amounts of replication, types of data, and so forth.

During or after the commencement of backup activities, backup server 110 may later need to send one or more alerts to a particular client. In particular, and as previously mentioned, implementations of the present invention also provide a number of mechanisms for effectively monitoring and ensuring that backup activities are proceeding as intended. For example, backup server 110 can identify one or more events, as registered by a particular client, and automatically send out corresponding alerts (e.g., email, or other appropriate means). For example, the client might request a communication for successful completion of backup activities on particular data sets/protection groups, or might request a communication only for certain failure activities.

Of course, backup server 110 could also be configured to send an alert as a matter of course. For example, even if not requested, backup server 110 can identify that, where backup activities of data source 130 have failed, the data loss tolerance specified by the particular client is not being met. As such, backup server 110 could nevertheless send some sort of a communication to the client regarding the same, even though the client may not have requested an alert. Backup server 110 could also send status updates regarding this particular data/data source at a later point, whether or not a specific alert was selected. Thus, there are a wide range of means by which a particular backup server can communicate to a particular client and keep the client informed about data/data source protection.

One will appreciate from the foregoing, therefore, that implementations of the present invention can be further modified within a number of parameters to ensure that protection intents and protection groups can be applied consistently within an organization, without necessarily having to specify a particular protection intent for each data/data source. In one implementation, for example, an administrator can define one or more protection intents (and corresponding properties—e.g., retention, expiration) for certain applications, or even user groups within one or more group policies. The one or more group policies, in turn, might store these one or more protection intents in central database 120, thereby allowing organization-wide distribution and inheritance of the protection group policies.

Thus, when a client belonging to (or associated with) a particular protection group (e.g., 160, 165) creates new data with a particular data source, the data can automatically inherit the corresponding protection intents for the group policy settings. For example, a client might create data pursuant to a generic group policy, wherein the data are tagged as "operational," and thus configured for thirty-day retention. By contrast, a client associated with one or more group policies in a "legal" department could create data that inherits protection intents associated with, for example, seven year retention.

In addition to being broadly applicable within the jurisdiction of a particular backup server, one will appreciate that these various protection intent selections can also be migrated easily from one backup server to the next. For example, the number of production servers (e.g., 105) in an organization may have increased over a period of time. Such an increase might, in turn, cause the organization to deploy one or more additional backup servers (e.g., 110, etc.) to meet protection needs. Based on the load at one backup server (e.g., 110), the backup administrator might move protection of production server 105 to another backup server (not shown). To do so, the backup administrator could simply send one or more instructions (e.g., a user interface at backup server 110) to relinquish ownership of backup agent 150 at production server 105.

This, in turn, can cause changes in the one or more protection groups (e.g., 160, 165), such that data/data sources (e.g., 130, 135, 140, 145) corresponding to production server 105 are removed. (The backups and backup updates can still be retained until the end of their respective retention period(s)). The backup administrator of server 110 can then (e.g., via a corresponding user interface at the new backup server) cause the new backup server to gain ownership of production server 105, such as by providing appropriate credentials. The new backup server can then perform the steps outlined previously, such as identifying the data and correspondingly associated protection intents on production server 105. The new backup server can further associate this data/data source(s) at production server 105 into one or more protection groups (not shown), whether pre-existing, or newly created.

Of course, one will appreciate that an administrator need not necessarily change ownership and protection groups at specific backup servers. For example, the backup administrator may simply update system-wide changes to protection intents and/or protection groups through a central database (e.g., 120), as applicable. Similarly, the backup administrator could simply migrate control of production server 105 to the new backup server through the central database 120. Central database 120 could also, of course, be used to migrate protection schema/ownership from one storage node to the next storage node, or from a backup server to a storage node (and vice versa), however desired.

Implementations of the present invention can also be configured to handle changes in the location of data/data sources from one production server to the next. For example, after data/data source(s) have been moved to another production server (not shown), the backup server (backup server 110, or a different backup server) that is responsible for the new production server can be informed of the new data via the corresponding backup agent (not shown) on that production server. In one implementation, this notification can occur when the backup agent for that production server performs its next backup operations for that production server. As previously described, the backup server for the new production server, along with the corresponding backup agent, can then identify any associated new data and its corresponding protection intents (if available), and thus adjust any protection groups (or create new protection groups).

In some cases, however, data (or a particular data source) may be associated with certain protection intents that specifically identify that the data are not to be backed up, or are to be excepted from some other general rule. For example, a client (e.g., an administrator of production server 105) may designate a particular volume (e.g., 115) to be protected by one of the predefined protection intents (e.g., 123, 127) of the organization. The client, however, may believe that one of the folders in volume 115 need not be protected. The client can thus change protection of volume 115 by designating the particular folder as non-protected. For example, the client sets the protection-intent of that particular folder to "null." As a result, backup agent 150 can ignore this folder during the next set of backup activities for production server 105, and any existing copies of the folder (and its corresponding data) can simply remain where previously designated until they expire.

Along these lines, the client could also associate certain data and/or data sources with particular protection intents settings so that data created by a particular data source do not necessarily inherit protection intents for a group, folder, volume, or other data source. For example, some word processing applications may create a large number of temporary files, which may not need to be protected, and may thus unnecessarily consume space on at backup server 110. A client could thus configure the word processing program to programmatically override protection intent(s) for temporary files (to some other protection intent, or to no protection). In particular, a word processing program (or database program) could provide one or more additional menus that allow a file author to set a specific protection intent level for the type of file. As such, if a file or set of files are later associated in groups that have a different protection level, or no protection at all, the originally specified protection intent level could be set to override an alternate or lesser protection intent, and thus preserve the original protection intent.

In addition, implementations of the present invention further provide one or more mechanisms for managing protection associations, protection groups (e.g., 160, 165), and the corresponding backups (e.g., 175, 180, 185, 190) thereof. For example, a client may desire to identify the set of backups existing for particular data/data sources (e.g., 130, 135). To do so, the client can select (e.g., right click on) the data/data source, and get the properties of the data source, such as through a "protection" tab on a user interface. This selection can further trigger backup agent 150 to query a database (not shown) at backup server 110 that stores protection status(es) of the various data/data source(s). The backup server 110 can then retrieve the set of backups existing for the particular data/data source. The client can then identify the current backup status of the selected data/data source, and thus compare that status with the available and/or associated protection intents.

Figure 2:
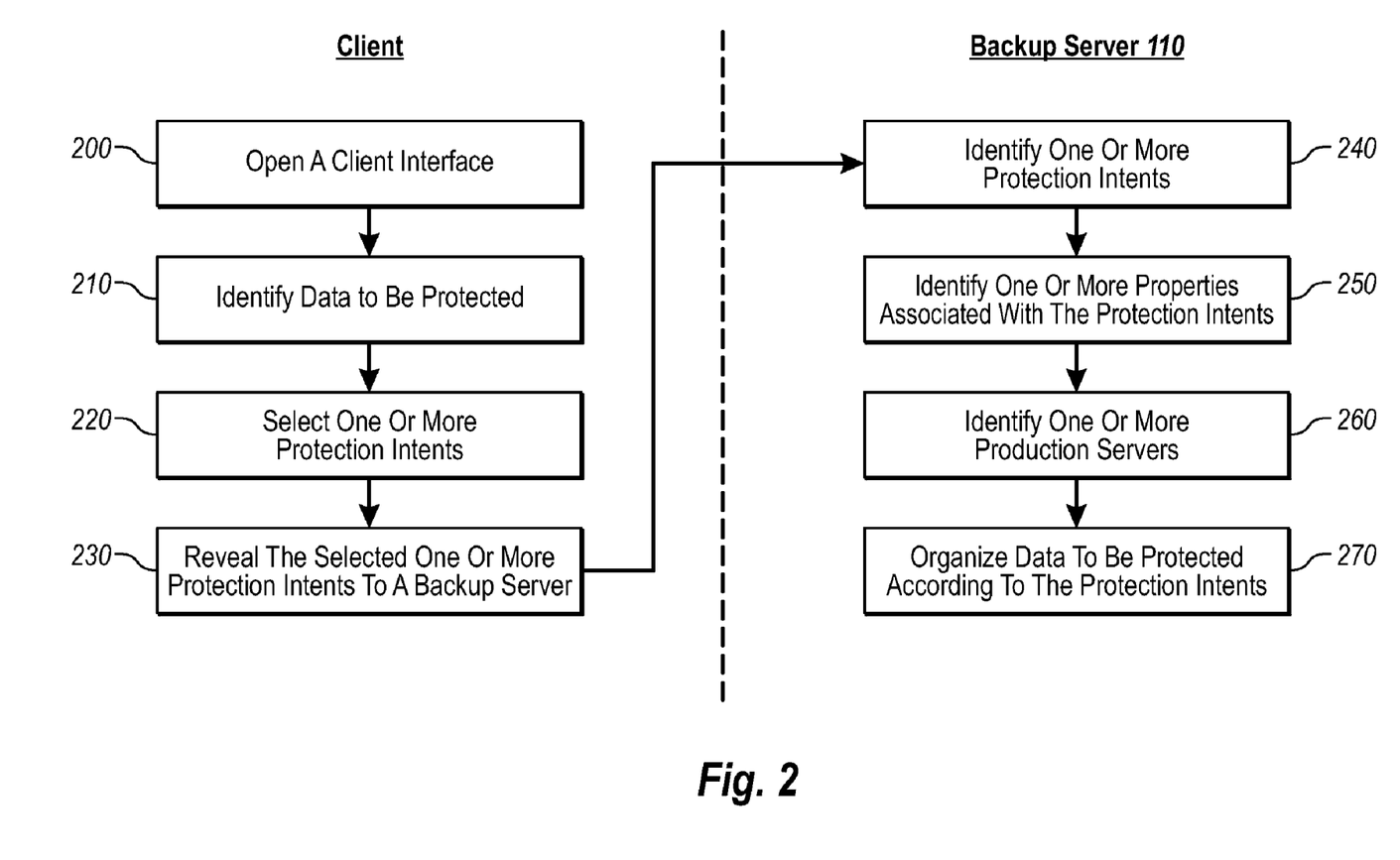
FIG. 2 illustrates flowcharts of methods in accordance with an implementation of the present invention from the perspective of a client and of a backup server of associating one or more protection intents with one or more data sources and of creating protection groups based identified protection intent associations.

Accordingly, FIGS. 1A-1C and the corresponding text provide a number of components and schematics for driving backup at the data level. In addition to the foregoing, implementations of the present invention can also be described in terms of flowcharts of methods for accomplishing a particular result. For example, FIG. 2 illustrates flowcharts of acts in methods from the perspective of a client (e.g., a client computer system, or associated client interface 125) and of backup server 110 for protecting data through one or more protection intents associated with the data/data source(s). The acts of these methods are discussed below with reference to the components and modules of FIGS. 1A-1C.

For example, FIG. 2 shows that a method from the perspective of a client (e.g., via a client computer system) of specifying one or more protection intents for data, such that backup of the data is driven at least in part at the data level can comprise an act of opening a client interface. For example, any of an end-user, policy maker, or administrator opens up client interface 125 pursuant to selecting one or more protection intents for data to be protected. As discussed herein, client interface 125 can be any of a traditional graphical user interface (e.g., a separate application program, or menu item in, for example, a word processing application program) or even a command line tool.

In addition, FIG. 2 shows that the method from the perspective of a client can comprise an act 210 of identifying data to be protected. Act 210 includes identifying data at one or more production servers, wherein the data are to be protected by one or more backup servers. For example, the client, through one or more client computer systems, identifies data 130 and/or 135 at production server 105. Production server 105 is, in turn, protected by one or more backup servers (e.g., 110).

FIG. 2 also shows that the method from the perspective of a client can comprise an act 220 of selecting one or more protection intents. Act 220 includes selecting through the client interface one or more protection intents for the data to be protected, wherein the selected one or more protection intents include one or more properties. For example, FIG. 1A shows that, through client interface 125, data 130 are associated with protection intent 123. Protection intent 123, in turn, is associated with one or more properties 133, such as when and how frequent to protect the data of interest, what compression/encryption algorithms may be used, and so forth.

Furthermore, FIG. 2 shows that the method from the perspective of a client can comprise an act 230 of revealing the selected one or more protection intents to a backup server. Act 230 includes revealing the selected one or more protection intents to the one or more backup servers, such that the one or more backup servers can backup the data to be protected in accordance with the selected one or more protection intents. For example, client interface 125 can send message 127 to any one or more of production server 105, a central database (e.g., 120), a storage node, or a backup server (e.g., 110). As previously discussed, message 127 can include one or more instructions that indicate the desired protection intent(s) (e.g., 123) and corresponding properties (e.g., 133) for the data/data source (e.g., 130) of interest.

Accordingly, FIG. 2 shows that the method from the perspective of backup server 110 of identifying one or more protection intents selected by the client for the data, such that backup of the data is driven at least in part at the data level can comprise an act 240 of identifying one or more protection intents. Act 240 includes identifying one or more protection intents that have been associated by a client with data to be protected. For example, backup server 110 identifies via one or more push or pull communications with production server 105 (e.g., via backup agent 150) and/or central database 120 that a new data/protection intent association has been created.

In addition, FIG. 2 shows that the method from the perspective of backup server 110 can comprise an act 250 of identifying one or more properties associated with the protection intents. Act 250 includes identifying one or more properties associated with the identified one or more protection intents. For example, backup server 110 (e.g., via communicating with backup agent 150) identifies that data 130 have been associated with protection intent 123, which further has specifically defined properties 127.

The method of FIG. 2 also shows that the method from the perspective of backup server 110 can comprise an act 260 of identifying one or more production servers. Act 260 includes identifying one or more production servers at which the data to be protected are stored. For example, backup server 110 can also identify, such as from central database 120, that data 130 reside on production server 105, and/or on specific volume 115 of production server 105. In some cases, backup server 110 can also identify that data 130 form part of a group of a particular type from a particular data source, which in turn are distributed across multiple production servers handled by backup server 110. Backup server 110, therefore, identifies each server at which the data are present.

Furthermore, FIG. 2 shows that the method from the perspective of backup server 110 can comprise an act 270 of organizing data to be protected according to the protection intents. Act 270 includes organizing the data to be protected into one or more protection groups based on the associated one or more protection intents. For example, backup server 110 identifies that data 130 and 145 are associated with a common protection intent 123, while data 135 and 140 are associated with a different protection intent 127. Backup server 110 can then identify if there are preexisting protection groups 155 for these protection intents, and if, not create them. FIG. 1B thus shows that data 130 and 145 can be placed in one protection group 160, while data 135 and 140 can be placed in another protection group 165.

As such, the components and methods described herein can easily provide an organization with the ability to preserve granular protection intents for data/data source(s). In particular, protection intents for particular data/data sources can be easily changed by and for a wide range of users, and these changes can be easily migrated across multiple storage and/or backup servers. As discussed herein, protection intents can be defined at a wide range of levels, such as per user, per user group, per document, per document type, per document/user location, and so forth. Accordingly, implementations of the present invention provide much more efficient means of backing up data than previously available. This is particularly so since data can be backed up at desired frequencies in accordance with various levels of importance, and other desired characteristics unique to each data group or data source, regardless of where the data may reside.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a client computer system in a computerized environment in which one or more backup servers back up data owned and/or created by a client and stored at one or more production servers, a method of at least the client specifying one or more protection intents for the data, such that backup of the data is driven at least in part at the data level, comprising the acts of:

opening a client interface;

identifying data at one or more production servers, wherein the data are to be protected by one or more backup servers;

selecting through the client interface one or more protection intents for the data to be protected, wherein the selected one or more protection intents include one or more properties; and revealing the selected one or more protection intents to the one or more backup servers, such that the one or more backup servers can backup the data to be protected in accordance with the selected one or more protection intents, wherein the act of revealing the selected one or more protection intents further comprises an act of associating the selected one or more protection intents with the data to be protected, such that the one or more backup servers can identify the one or more protection intents when scanning the data to be protected at the one or more production servers.

2. The method as recited in claim 1, wherein the one or more protection intents are pre-defined.

3. The method as recited in claim 1, wherein the act of revealing the selected one or more protection intents further comprises an act of sending the selected one or more protection intents to a central database.

4. The method as recited in claim 3, wherein the one or more protection intents are stored in the central database as an XML string that indicates an association between the data to be protected and the selected one or more protection intents.

5. The method as recited in claim 3, further comprising the acts of:

modifying any of the one or more properties through the client interface; and updating the one or more protection intents at the central database in accordance with the modification to the one or more properties.

6. The method as recited in claim 1, further comprising a step for defining the one or more properties corresponding to the selected one or more protection intents.

7. The method as recited in claim 6, wherein the step for defining the one or more properties further comprises the acts of:

selecting a disk drive for a high speed recovery option;

selecting a tape drive for a long term retention option; and selecting any of the disk drive or tape drive for a disaster recovery option.

8. The method as recited in claim 6, wherein the step for defining the one or more properties further comprises the acts of:

selecting a length of time to store one or more data backups on a disk drive; and selecting a length of time to store one or more data backups on a tape drive.

9. The method as recited in claim 6, wherein the step for defining the one or more properties further comprises the acts of:

selecting one or more of a synchronization frequency;
selecting a time to backup the identified data to be protected.

10. The method as recited in claim 6, wherein the step for defining the one or more properties further comprises the acts of:
selecting an encryption value;
selecting a compression value; and
selecting a time to archive the data to be protected.

11. The method as recited in claim 1, further comprising an act of selecting one or more alerts through the client interface, wherein the one or more alerts are configured to indicate that one or more aspects of the selected one or more protection intents are not being met for the data to be protected.

12. The method as recited in claim 11, further comprising the acts of sending one or more messages to the backup server through the client interface, wherein the one or more messages request a current state of protection for the data to be protected.

13. At a backup server in a computerized environment in which one or more backup servers back up data owned and/or created by a client and stored at one or more production servers, a method of identifying one or more protection intents selected by the client for the data, such that backup of the data is driven at least in part at the data level, comprising the acts of:
identifying one or more protection intents that have been associated by a client with data to be protected and that are revealed to the backup server when the backup server scans the data to be protected;
identifying one or more properties associated with the identified one or more protection intents;
identifying one or more production servers at which the data to be protected are stored; and
organizing the data to be protected into one or more protection groups based on the associated one or more protection intents.

14. The method as recited in claim 13, wherein the one or more protection intents are predefined at any of the one or more backup servers or one or more production servers before being associated by the client.

15. The method as recited in claim 13, wherein at least a portion of the one or more properties are defined by the client, and wherein at least a different portion of the one or more properties are defined through the one or more backup servers.

16. The method as recited in claim 15, wherein the at least a different portion of one or more defined properties comprises one or more settings indicating one or more storage nodes at which to store one or more backups of the data to be protected.

17. The method as recited in claim 15, wherein the at least a different portion of one or more defined properties comprises one or more settings indicating any one or more of:
(i) a tape library to use;
(ii) a quantity of a tape drive to use;
(iii) a physical disk to use; or
(iv) an amount of the physical disk to use.

18. The method as recited in claim 13, further comprising the acts of:
receiving one or more instructions to backup one or more different production servers;
identifying one or more different protection intents associated with data at the one or more different production servers; and replicating the data at the one or more different production servers based on properties of the corresponding one or more different protection intents.

19. The method of claim 13, further comprising the backup server sending an alert to the client corresponding to backup of the data.

20. At a client computer system in a computerized environment in which one or more backup servers back up data owned and/or created by a client and stored at one or more production servers, a computer storage media having computer-executable code stored thereon that, when executed, cause one or more processors at the client computer system to perform a method comprising the acts of:
opening a client interface;
identifying data at one or more production servers, wherein the data are to be protected by one or more backup servers;
selecting through the client interface one or more protection intents for the data to be protected, wherein the selected one or more protection intents include one or more properties; and
revealing the selected one or more protection intents to the one or more backup servers, such that the one or more backup servers can backup the data to be protected in accordance with the selected one or more protection intents, wherein the act of revealing the selected one or more protection intents further comprises an act of associating the selected one or more protection intents with the data to be protected, such that the one or more backup servers can identify the one or more protection intents when scanning the data to be protected at the one or more production servers.

21. The method of claim 20, wherein the alert comprises an alert indicating that one or more aspects of the selected one or more protection intents are not being met for the data.

22. At a backup server in a computerized environment in which one or more backup servers back up data owned and/or created by a client and stored at one or more production servers, a method of identifying one or more protection intents selected by the client for the data, such that backup of the data is driven at least in part at the data level, comprising the acts of:
identifying one or more protection intents that have been associated by a client with data to be protected;
identifying one or more properties associated with the identified one or more protection intents, wherein at least a portion of the one or more properties are defined by the client, and wherein at least a different portion of the one or more properties are defined through the one or more backup servers;
identifying one or more production servers at which the data to be protected are stored; and
organizing the data to be protected into one or more protection groups based on the associated one or more protection intents.

23. The method as recited in claim 22, wherein the at least a different portion of one or more defined properties comprises one or more settings indicating one or more storage nodes at which to store one or more backups of the data to be protected.

24. At a backup server in a computerized environment in which one or more backup servers back up data owned and/or created by a client and stored at one or more production servers, a method of identifying one or more protection intents selected by the client for the data, such that backup of the data is driven at least in part at the data level, comprising the acts of:

identifying one or more protection intents that have been associated by a client with data to be protected;

identifying one or more properties associated with the identified one or more protection intents, wherein at least a portion of the one or more properties are defined by the client, and wherein at least a different portion of the one or more properties are defined through the one or more backup servers and wherein the at least a different portion of one or more defined properties comprises one or more settings indicating any one or more of:

(i) a tape library to use;
(ii) a quantity of a tape drive to use;
(iii) a physical disk to use; or
(iv) an amount of the physical disk to use;

identifying one or more production servers at which the data to be protected are stored; and organizing the data to be protected into one or more protection groups based on the associated one or more protection intents.

25. At a client computer system in a computerized environment in which one or more backup servers back up data owned and/or created by a client and stored at one or more production servers, a method of at least the client specifying one or more protection intents for the data, such that backup of the data is driven at least in part at the data level, comprising the acts of:

opening a client interface;

identifying data at one or more production servers, wherein the data are to be protected by one or more backup servers;

selecting through the client interface one or more protection intents for the data to be protected, wherein the selected one or more protection intents include one or more properties;

selecting one or more alerts through the client interface, wherein the one or more alerts are configured to indicate that one or more aspects of the selected one or more protection intents are not being met for the data to be protected; and revealing the selected one or more protection intents to the one or more backup servers, such that the one or more backup servers can backup the data to be protected in accordance with the selected one or more protection intents.

26. The method as recited in claim 25, further comprising the acts of sending one or more messages to the backup server through the client interface, wherein the one or more messages request a current state of protection for the data to be protected.

* * * * *